(12) United States Patent
Mbadinga Mouanda et al.

(10) Patent No.: US 12,508,533 B2
(45) Date of Patent: Dec. 30, 2025

(54) DEVICE AND METHOD FOR CONDITIONING AIR IN AN ENCLOSED SPACE AND VEHICLE COMPRISING THE DEVICE

(71) Applicant: MANN+HUMMEL GmbH, Ludwigsburg (DE)

(72) Inventors: Gelase Mbadinga Mouanda, Sachsenheim (DE); Franz Lanzerath, Aachen (DE); Stefan Rauscher, Aachen (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 408 days.

(21) Appl. No.: 18/155,767

(22) Filed: Jan. 18, 2023

(65) Prior Publication Data
US 2023/0241545 A1    Aug. 3, 2023

(30) Foreign Application Priority Data
Feb. 3, 2022  (EP) .................................... 22154895

(51) Int. Cl.
*B01D 53/02*  (2006.01)
*B01D 53/04*  (2006.01)
*B60H 1/32*  (2006.01)

(52) U.S. Cl.
CPC ..... *B01D 53/0454* (2013.01); *B01D 53/0438* (2013.01); *B01D 53/0446* (2013.01); *B60H 1/32014* (2019.05); *B01D 2257/504* (2013.01); *B01D 2257/80* (2013.01);
(Continued)

(58) Field of Classification Search
CPC .......... B01D 2257/504; B01D 2257/80; B01D 2259/4009; B01D 2259/402; B01D 2259/4566; B01D 53/0438; B01D 53/0446; B01D 53/0454; B60H 1/008; B60H 1/00849; B60H 1/32014; B60H 2003/028; B60H 3/024; Y02C 20/40
See application file for complete search history.

(56) References Cited

U.S. PATENT DOCUMENTS

2011/0277630 A1* 11/2011 Greenough .......... B01D 53/047
96/108
2019/0111378 A1*  4/2019 Ishii ................... B01D 53/8671
2020/0346511 A1  11/2020 Hasegawa
(Continued)

FOREIGN PATENT DOCUMENTS

FR           3062604 A1    8/2018

*Primary Examiner* — Christopher P Jones

(57) ABSTRACT

Device for conditioning air in an enclosed space, including first and second sorption units, each for being transferred from a sorption mode into a desorption mode and vice-versa; and to, in the sorption mode, sorb the one or more air constituents from air of the enclosed space; and to, in the desorption mode, desorb the one or more air constituents, and including an air distribution device to, in a first operating state, switch to a second operating state in which exchange of the air of the enclosed space with exterior air may be provided, if it is determined that a concentration of at least one air constituent of the one or more air constituents is above a limit, and, in the second operating state, switch to the first operating state, if it is determined that concentrations of all air constituents of the one or more air constituents are within their corresponding limit.

20 Claims, 8 Drawing Sheets

(52) U.S. Cl.
CPC ............... *B01D 2259/4009* (2013.01); *B01D 2259/402* (2013.01); *B01D 2259/4566* (2013.01)

(56) References Cited

U.S. PATENT DOCUMENTS

2021/0025306 A1\* 1/2021 Lauritano ............... F01N 3/021
2022/0016567 A1   1/2022 Mbadinga Mouanda et al.

\* cited by examiner

| STATE | | Condition | Action |
|---|---|---|---|
| ST1 | | $c_x >$ UPL, any x | Switch to ST2 |

FIG. 10A

| STATE | | Condition | Action |
|---|---|---|---|
| ST2 | | $c_x \leq$ UPL, all x | Switch to ST1 |

FIG. 10B

| STATE | | Condition | Action |
|---|---|---|---|
| ST1 | | $c_x \leq$ UPL - Hyst, all x | Switch to ST0 |

FIG. 10C

DEVICE AND METHOD FOR CONDITIONING AIR IN AN ENCLOSED SPACE AND VEHICLE COMPRISING THE DEVICE

CROSS-REFERENCE TO RELATED APPLICATIONS

This patent application claims priority to European Patent Application No. EP22154895.1 filed with the European Patent Office on 3 Feb. 2022, the subject matter of which is hereby incorporated by reference.

TECHNICAL FIELD

The invention relates to a device for conditioning air in an enclosed space, a vehicle comprising the device, a method of conditioning air in an enclosed space, and a computer program product comprising instructions which, when the program is executed by a microprocessor, causes the microprocessor to perform the method.

BACKGROUND ART

In at least partially electrically driven motor vehicles, for reaching a range as large as possible it is productive to save as much energy as possible. Usually, for reasons of comfort a passenger compartment of such a motor vehicle can be air conditioned by means of an air conditioning device. In the recirculating operation for air conditioning the passenger compartment, the water contained in the exhalation air of the passengers can however accumulate in the passenger compartment. Moreover, carbon dioxide contained in the exhalation air may also accumulate in the passenger compartment. This can lead to loss of concentration or even health impairment of the occupant.

WO 2020/200950 A1 describes a device for combined reduction of carbon dioxide and water content in an enclosed air volume, having two sorption units that are used alternately. Further, WO 2004/101113 A1 describes a filtering method and a device for removing impurities from air in a raid shelter, wherein the air is driven through a carbon dioxide filter for being trapped in the filter, which afterwards, is regenerated.

However, such devices also consume energy, for example, during regeneration. Thus, is desirable to provide for a device with a reduced energy consumption, having an improved efficiency.

SUMMARY

Various embodiments concern a device for conditioning air in an enclosed space (or simply referred to device for conditioning air). The device for conditioning air in an enclosed space may include a first sorption unit, and a second sorption unit. Each of the first sorption unit and the second sorption unit may include a receptacle for receiving a sorbent configured to sorb one or more air constituents, e.g., carbon dioxide and/or water. Reference in the present disclosure to one or more air constituents does not include oxygen gas ($O_2$), which in mentioned explicitly as oxygen. Each of the first sorption unit and the second sorption unit may be configured to be transferred from a sorption mode into a desorption mode and from the desorption mode into the sorption mode. Each of the first sorption unit and the second sorption unit may be configured to, in the sorption mode, sorb the one or more air constituents from air of the enclosed space. Each of the first sorption unit and the second sorption unit may be configured to, in the desorption mode, desorb the one or more air constituents, for example to a supplied regeneration air or to raw air.

The device for conditioning air may further include an air distribution device configured to, in an operating state, alternately operate one of the first sorption unit and the second sorption unit in the sorption mode, and operate the other one of the first sorption unit and the second sorption unit in the desorption mode. In the desorption mode a desorption process may be carried out and when completed the sorption unit may stay idle until it goes into sorption mode.

The operating state may include a first operating state and a second operating state. The air distribution device may be further configured to in the first operating state, switch to a second operating state in which exchange of the air of the enclosed space with exterior air may be provided, if it is determined that a concentration of at least one air constituent of the one or more air constituents may be above a corresponding pre-determined upper limit. Accordingly, in the first operating state, no exchange of the air of the enclosed space with exterior air is provided by the air distribution device, and air of the enclosed space may be recirculated.

The air distribution device may be further configured to, in the second operating state, switch to the first operating state, if it is determined that concentrations of two or more, e.g. all, air constituents of the one or more air constituents are within their corresponding pre-determined upper limit.

The air distribution device may be further configured to, in the first operating state, switch to an idle state, in which none of the first sorption units and the second sorption units are in the sorption mode, if it is determined that the concentrations of all air constituents of the one or more air constituents are within their corresponding pre-determined upper limit minus a hysteresis. Based on the present description, the skilled person in the art understands how to implement a hysteresis to avoid an unwanted oscillation between states, for example, adding a hysteresis to a value may include adding a positive tolerance to the value, or negative tolerance to the value, or both.

Various embodiments may concern a vehicle including the device for conditioning air in an enclosed space of any of the previous claims.

Various embodiments concern a method of conditioning air in an enclosed space. The method may include in a first operating state and in a second operating state, alternately operate one of a first sorption unit and a second sorption unit in a sorption mode, and operate the other one of the first sorption unit and the second sorption unit in a desorption mode. An air distribution device may include the first sorption unit and the second sorption unit. The method may include operating in the first operating state. The method may include determining, in the first operating state at a first time, that a concentration of at least one air constituent of the one or more air constituents is above a corresponding pre-determined upper limit, and switching to a second operating state in which exchange of the air of the enclosed volume with exterior air may be provided. The method may include determining, in the second operating state, that concentrations of all air constituents of the one or more air constituents are within their corresponding pre-determined upper limit; and switching to the first operating state. The method may include in the first operating state at a second time, determine that the concentrations of all air constituents of the one or more air constituents are within their corresponding pre-determined upper limit minus hysteresis; and switching to an idle state, in which none of the first sorption units and the second sorption units are in the sorption mode.

According to various embodiments, the method may further include:

in the idle state, determine that a concentration of at least one of the one or more air constituents is above its corresponding pre-determined upper limit; and switching to the first operating state.

According to various embodiments, the method may further include:

in the second operating state, determine that a concentration of at least one air constituent of the one or more air constituents is outside of its corresponding pre-determined upper limit; and switching to a fresh air state in which none of the first sorption units and the second sorption units are in the sorption mode.

According to various embodiments, the method may further include: in the in the fresh air state, determined that the concentrations of all air constituents of the one or more air constituents are within their corresponding pre-determined upper limit; and switching to the second operating state.

According to various embodiments, the method may further include: in the first operating state, determining that a concentration of oxygen is lower than a pre-determined oxygen concentration lower limit, for example, irrespective of any concentration of the one or more air constituents; and switching to the second operating state.

According to various embodiments, the method may further include: in the second operating state, determining that the concentration of oxygen is higher than the pre-determined oxygen concentration lower limit; and switching to the first operating state.

According to various embodiments, the method may further include: in the fresh air state, determining that the concentrations of two or more, e.g. all, air constituents of the one or more air constituents are above their corresponding pre-determined operating limit (and optionally below the upper limit optionally minus hysteresis) and the concentration of oxygen is higher than the pre-determined oxygen concentration lower limit; and switching to the idle state.

According to various embodiments, the method may further include: in the idle state, determining that the concentrations of two or more, e.g. all, air constituents of the one or more air constituents are above their corresponding pre-determined operating limit [and below the upper limit] and the concentration of oxygen is lower than the pre-determined oxygen concentration lower limit; and switching to the fresh air state.

According to various embodiments, the device for conditioning air may be further configured to, before switching to the second operating state or from the second operating state to the first operating state:

determine an amount of air to be exchanged for reaching the switching condition and determine an exterior air conditioning energy estimation for the amount of air;

determine an amount of the one or more air constituents to be sorbed for meeting the switching condition and determining its corresponding regeneration energy budget required to regenerate the first sorption unit and/or the second sorption unit for said amount of the one or more air constituents; and switch to the operating state only if the regeneration energy budget is smaller than the exterior air conditioning energy estimation.

As used herein, and in accordance with various embodiments, a regeneration energy budget is the amount of energy required to perform the regeneration. For example, the energy budget may be the number in J (joule) or kW.h needed to complete the regeneration.

According to various embodiments, the device for conditioning air may be further configured to, before switching to the second operating state: switch to the operating state only if temperature and relative humidity of exterior air are each, within a pre-determined range of a corresponding set value.

Various embodiments concern a computer program product including instructions which, when the program may be executed by a microprocessor, causes the microprocessor to perform the method according to various embodiments.

BRIEF DESCRIPTION OF DRAWINGS

The drawings are schematically and simplified for ease of explanation and represent non-limiting examples. The drawings show:

FIGS. 10A to 10C shows in table format the switching conditions for the device 5 and method in accordance with various embodiments;

DETAILED DESCRIPTION

Figure 1:
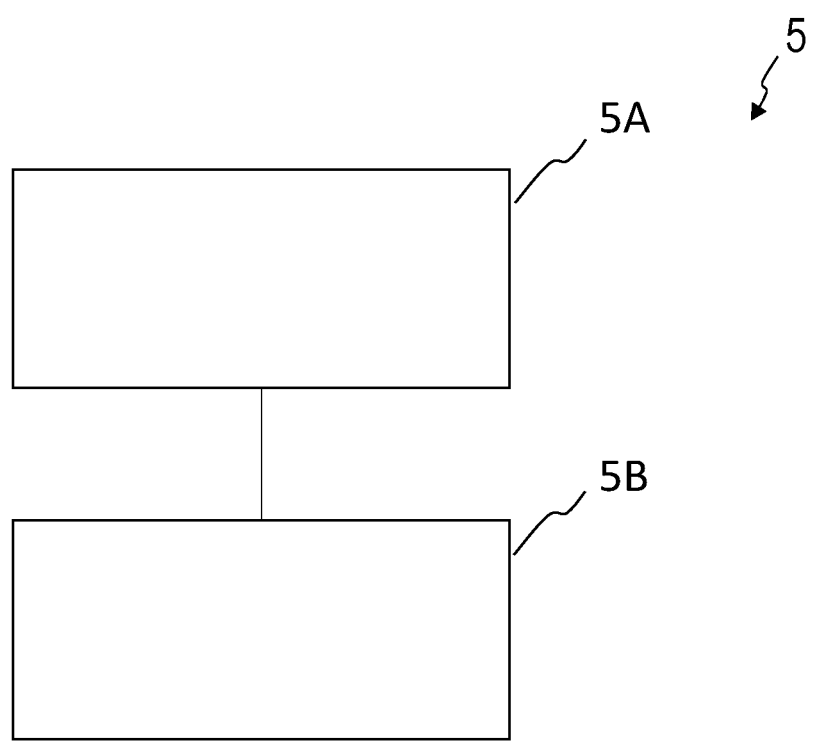
FIG. 1 shows a schematic of the device 5 for conditioning air in an enclosed space comprising an air sorption device 5A and an air distribution device 5B.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein and in accordance with various embodiments the expressions "enclosed air volume" and "enclosed space" may be used interchangeably.

As used herein and in accordance with various embodiments, "air of the enclosed space" to be conditioned, e.g., entering the device for conditioning air, may also be referred herein as regeneration air. Wherein conditioned air (that has passed the first and/or second sorption units) may be referred to as clean air. Air from the exterior environment, exterior to the enclosed space, may also be referred to as raw air.

As used herein and in accordance with various embodiments the expression "within a limit" may mean below and up to the limit, for example within a range from 0 and up to the limit.

As used herein and in accordance with various embodiments, "water" means $H_2O$, and may be in the form of vapor measured by humidity, e.g., relative humidity.

As used herein and in accordance with various embodiments, one or more air constituents to be monitored may be used for controlling the method disclosed herein. The one or more air constituents to be monitored are simple referred to as "one or more air constituents" for ease of reference. A reference to "one or more air constituents" does not include the meaning of oxygen, and for the present disclosure, oxygen ($O_2$) is simply referred to as "oxygen" and treated separately of the "one or more air constituents" for ease of explanation. Parts of the air that do not need to be removed, and therefore are included in the air, are mainly nitrogen gas, oxygen, and argon, from these it is important that oxygen remains at least a minimum level (preferably at about 20.95 volume % of the air).

As used herein and in accordance with various embodiments, the monitoring of the air constituents of enclosed space may be performed by corresponding sensors operably arranged to measure air from the enclosed space, for example, before it is conditioned, such as, upstream of the air distribution system.

According to various embodiments, the one or more air constituents may include a selection of one or more of: carbon dioxide, water, carbon monoxide, nitrogen oxides, volatile organic compounds. Accordingly, the sorption units may be suitable to remove a selection of one or more of: carbon dioxide, water, carbon monoxide, nitrogen oxides, volatile organic compounds, and may further remove fine particles from air. For this purpose, further suitable sorbents can be provided. Moreover, the sorption units may comprise a suitable filter medium for filtering the fine particles. The filter medium can function as a carrier material for the sorbents.

In embodiments, the sorption units may include a first sorbent that is suitable to adsorb carbon dioxide, a second sorbent that is suitable to adsorb water, and optionally further sorbents that are suitable to remove fine particles, carbon monoxide, nitrogen oxides, volatile organic compounds from the raw air. The further sorbents may be introduced between two carrier layers, in particular nonwoven carrier layers, or wherein the sorbents and the further sorbents are mixed with each other. The number and type of the further sorbents is arbitrary. The further sorbents can comprise active carbon which, in particular in the form of a bulk material, may be introduced between the two carrier layers. The additional sorbent or the additional sorbents can be mixed with the $CO_2$ sorbent and/or the $H_2O$ sorbent in order to build one or a plurality of mixed bulk materials.

In embodiments, the sorption units may be suitable to further remove one or more of: allergens, bacteria, and viruses from the raw air. This can be realized by a functional coating of carrier materials, for example, of a nonwoven carrier, or by a functional coating of the sorbents. Moreover, the sorption units can comprise at least one scent component in regard to a comfort aspect.

According to various embodiments, a device for conditioning air as disclosed herein does reduction of undesired one or more air constituents (e.g., carbon dioxide and water content) in an enclosed air volume, in particular in a passenger compartment of a vehicle. The first sorption unit and the second sorption unit each may contain a plurality of sorbents, wherein the sorption units each can be transferred from a sorption mode, in which the sorption units sorb carbon dioxide and water from raw air of the enclosed air volume, into a desorption mode, in which the sorption units desorb one or more air constituents (e.g., carbon dioxide and water) to supplied regeneration air, and vice versa, and an air distribution unit by means of which, as a function of the content of the one or more air constituents in the enclosed air volume, the sorption units each can be transferred (in other words, switched) alternately from the sorption mode into the desorption mode and vice versa such that, in at least one operating state of the device for conditioning air, one of the two sorption units is in the sorption mode while the other of the two sorption units is in the desorption mode.

According to an embodiment, it can be provided that, in the desorption mode, the regeneration air that is guided through the sorption unit which is in the desorption mode can be supplied as loaded regeneration air to an environment, in particular via a desorption conduit.

According to various embodiments, the device for conditioning air may include an air sorption device and an air distribution device. The air sorption device includes the first and second sorption units. The air distribution device includes one or more of the air conduits, valves, flaps, and may further include the control circuit. The air distribution device and the air sorption device may be integrated into the device for conditioning air as a common assembly, for example which can be transported and installed as a single integrated unit. The air distribution device may control the air distribution and/or sorption modes on the basis of sensor signals.

The sorption units are suitable in particular to adsorb carbon dioxide and water. "Sorption" is to be understood presently as processes which lead to accumulation of a substance, for example, of carbon dioxide or water, inside a phase or at a boundary surface between two phases. The accumulation within a phase is referred to as absorption, the accumulation at the boundary surface is referred to as adsorption. "Desorption" is understood presently as processes in which atoms or molecules, in particular carbon dioxide or water, leave the surface of a solid body. The desorption thus represents generally the reversal of sorption.

The sorption units can be pure adsorption units or can be referred to as such. The sorption units may each or combined comprise a cartridge form so that they can be easily and quickly exchanged. The sorption units can comprise a cylindrical, in particular a hollow cylindrical, a plate-shaped, a pie-shaped or any other geometry.

The sorption units each may include a plurality of sorbents or sorption agents. In particular, a sorbent can be provided that is suitable to sorb, preferably to adsorb, carbon dioxide. This sorbent can be referred to as carbon dioxide sorbent or $CO_2$ sorbent. A further sorbent can be provided that is suitable to sorb, in particular to adsorb, water. This sorbent can be referred to as water sorbent or $H_2O$ sorbent. The sorbents can be present in granular form or fiber form, in particular in the form of a bulk material. In particular, the sorbents may be fixed by means of a carrier material. The sorbents can also be pure adsorbents or can be referred to as such.

The sorption mode can also be a pure adsorption mode or can be referred to as such. The desorption mode can also be referred to as regeneration mode. That the sorption units each are "transferable" from the sorption mode into the desorption mode and vice versa is to be understood in particular such that transferring can be performed back and forth between the sorption mode and the desorption mode. This transferring may be realized by means of the air distribution device in such a way that the sorption units are supplied either with the raw air or the regeneration air. For this purpose, the air distribution device may include a plurality of valves and/or flaps. The air distribution device may include, for example, a flap system.

That the air distribution device is suitable to "alternately" transfer the sorption units is to be understood in particular such that, for example, the first sorption unit is in the sorption mode while the second sorption unit is in the desorption mode. After transferring by means of the air distribution device, this is exactly reversed. In the desorption mode a desorption process may be carried out and when completed the sorption unit may stay idle until it goes into sorption mode.

In examples, the regeneration air can be taken from the enclosed air volume or the environment, such as the environment of the motor vehicle. Initially, the regeneration air is not loaded. In the desorption mode, the non-loaded regeneration air is loaded, e.g., with carbon dioxide and water, and is supplied as loaded regeneration air to the environment. That the regeneration air is not loaded with one or more air constituents is to be understood in particular such that the regeneration air can take up the with one or more air constituents that is/are stored in the sorption unit which is in the desorption mode. However, this does not preclude that the non-loaded regeneration air may also contain a certain quantity of the with one or more air constituents (such as carbon dioxide and water). Preferably, the non-loaded regeneration air is not saturated with one or more air constituents (e.g. carbon dioxide and water). Therefore, the non-loaded regeneration air can also be taken from the enclosed volume.

Since the sorption units are operated alternately, an interruption-free and thus continuous reduction of the one or more air constituents (undesired, e.g., carbon dioxide and water content) in the enclosed air volume is possible. This means that in the enclosed air volume a recirculation operation can take place without having to take in ambient air from the environment in order to keep the contents of the one or more air constituents sufficiently low. Thus, the accumulation of the undesired one or more air constituents in the enclosed air volume with the disadvantages explained in the introduction can be prevented reliably. By dispensing with (i.e., leaving out) the supply of ambient air into the vehicle air conditioning system, energy savings can be achieved because cooling or heating of supplied ambient air can be dispensed with. In case that the motor vehicle is operated electrically, this leads to an extension of the range of the motor vehicle. Moreover, by dispensing with supply of ambient air, the service life of an interior filter of the motor vehicle can also be extended because no particulate matter must be filtered out from the ambient air. A further advantageous effect results in that the components of a vehicle air conditioning system (respective heat exchangers for heat sink and heat source, compressor etc.) can be designed smaller which provides potential for downsizing.

In embodiments, the air distribution device may include a plurality of valves which can be transferred such that, in operation of the device for conditioning air, the raw air from the enclosed air volume can be supplied to the sorption unit which is in the sorption mode in order to remove the one or more air constituents (e.g. carbon dioxide and the water) from the raw air and the regeneration air can be supplied to the sorption unit which is in the desorption mode in order to remove the one or more air constituents (e.g. carbon dioxide and the water) from the sorption unit. Preferably, four valves are provided. The valves can be flap valves. Preferably, the valves are multiway valves, in particular three-way valves or 4-, 6-, 8-way valves.

In embodiments, the device for conditioning air may further include at least one heating element for introducing heat into the sorption unit which is in the desorption mode. For example, each sorption unit has a corresponding heating element. The heating element can be a heating wire that extends through the respective sorption unit. The heat can however also be introduced in any other way into the sorption unit which is in the desorption mode. For example, the heat can be waste heat of an electric motor for driving the motor vehicle. The heater is expediently only transferred on when the respective sorption unit is in the desorption mode.

In embodiments, the heating element may be positioned upstream of the sorption unit. "Upstream" means presently in front of the sorption units along a flow direction of the non-loaded regeneration air supplied to the sorption units. The heating element, in some embodiments, is not integrated in the sorption units. The heating element may, in particular, be arranged outside of the sorption units. The heating element introduces heat into the non-loaded regeneration air which, in the desorption mode of the respective sorption unit, takes up water and carbon dioxide and is guided away from the sorption units as loaded regeneration air. The heating element can be a heat exchanger or comprise a heat exchanger. The heat which is employed for heating can be taken from a cooling agent circuit, for example, of a conventional internal combustion engine, a battery cooling system or a fuel-cell cooling circuit. In addition, the sorption units may also comprise heating elements integrated therein. In some embodiments, the sorption units may include a common heating element. In this way, a separate heating element for each sorption unit can be dispensed with.

In some embodiments, the device for conditioning air, e.g., as part of the air distribution device, may further include a regeneration valve which includes one or more of a first transfer position in which the regeneration air can be supplied from an environment of the enclosed air space (e.g., raw air) to the sorption unit which is in the desorption mode; a second transfer position in which the regeneration air can be supplied from the enclosed air volume to the sorption unit which is in the desorption mode. The regeneration valve may further include a third transfer position in which the sorption unit which is in the desorption mode can be regenerated under vacuum. The regeneration valve may be a three-way valve. Downstream of the regeneration valve, a check valve can be provided that prevents return flow of the regeneration air loaded with the one or more air constituents (e.g., carbon dioxide and water) into the enclosed air volume.

In embodiments, the device for conditioning air, e.g., as part of the air distribution device, may further include a blower which supplies the raw air to the sorption unit which is in the sorption mode. The blower may be a fan, e.g., an electric fan. The blower can also be referred to as first blower or as sorption blower. A sorption performance of the sorption unit which is in the sorption mode can be adapted, for example, by a change of a volume flow which is generated by the blower. The volume flow can be influenced by means of a rotary speed change of the blower. In embodiments, the blower may be part of an air conditioning device, e.g., HVAC unit. In this way, it is possible to save a blower for the device for conditioning air. In particular, the device for conditioning air can be partially or completely integrated into the air conditioning device. Alternatively, the device for conditioning air, as a modular component, can also be completely separate from the air conditioning device and thus be self-sufficient.

In embodiments, the device for conditioning air, e.g., as part of the air distribution device, may include a blower which supplies the regeneration air to the sorption unit which is in the desorption mode, wherein the blower, in relation to the sorption units, may be arranged at the pressure side or at the suction side. The blower may be a fan, e.g., an electric fan. The blower can also be referred to as second blower or as desorption blower. The first blower and the second blower may include a common drive element that, by means of couplings, can be coupled to blower wheels of the blowers and decoupled therefrom. In this way, a drive element can be saved. The drive element may be an electric motor.

According to various embodiments, the air distribution device may be configured to provide for exchange of the air of the enclosed space with exterior air (e.g., raw air), for example in the second operating state. The exchange may include the introduction of raw air into the enclosed space. For example, the air distribution device may include a bypass conduit and a bypass valve that may be selectively switched from a raw air state, in which the raw air can be supplied to the desorption unit which is in the sorption mode, into a bypass state, in which the raw air by means of the bypass conduit can be guided by bypassing the sorption units back into the enclosed air volume, and vice-versa. Alternatively or in addition, another bypass conduit as well as another bypass valve can be provided. The another bypass valve can be switched from a first switch state, in which the regeneration air is supplied to the sorption unit which is in the desorption mode, into a second switch state, in which the regeneration air can be guided by means of the bypassing conduit so as to bypass the sorption units into the environment, and vice versa.

According to some embodiments, downstream at the pressure side of the desorption blower device, the air distribution device may include a branch in the desorption conduit which can be switched by means of a recirculation valve. The branch opens into a recirculation conduit which is connected in fluid communication with an inlet of the regeneration valve or opens downstream of an outlet of the regeneration valve into a regeneration air conduit that is connected to the outlet. In this way, it is achieved that at least a portion of the volume flow which is conveyed by the desorption blower device is recirculated, i.e., can be guided multiple times across the sorption unit which is currently in the desorption mode. This has primarily energetic advantages because the heat quantity introduced for regeneration is not guided into the environment after a single pass through the sorption unit which is in the desorption mode but is recirculated (guided in a circuit) until the air with regard to the one or more air constituents is completely loaded, e.g., saturated. In this way, as a result the energy consumption of the heating device can be drastically reduced which further positively influences an energy-efficient operation of the whole device for conditioning air.

According to an embodiment, the branch can be switched by means of a recirculation valve so that by means of the desorption blower device the regeneration air can be selectively recirculated through the sorption units or can be guided into the environment. With regard to the return into the regeneration air conduit, there are now various possibilities.

First, according to an embodiment, the recirculation conduit can be connected in fluid communication with an inlet of the regeneration valve wherein, by means of the regeneration valve, a fourth switch position can be switched in which the regeneration air can be supplied from the recirculation conduit to the sorption unit which is in the desorption mode, and vice versa. According to this embodiment, no continuous supply of non-loaded regeneration air from the environment takes place but instead it is provided to switch the regeneration valve as well as the recirculation valve in pairs in a cyclic fashion in order to enable a supply of non-loaded fresh air and discharge of loaded regeneration air from the "recirculation circuit".

According to a second embodiment, it may be provided that a throttle valve, in particular an adjustable throttle valve, is arranged in relation to fluid communication between the outlet of the regeneration valve and the inlet of the recirculation conduit into the regeneration air conduit. According to this embodiment, now a continuous supply of non-loaded regeneration air from the environment can be realized wherein the rate at which the non-loaded regeneration air from the environment is supplied to the "recirculation circuit" can be adjusted as needed.

In the following, embodiments of the disclosure will be detailed using the figures for illustration purposes, however, the embodiments are not necessarily limited to what is represented in the figures. Additionally, the figures may be schematically simplified for ease of reference.

Figure 2:
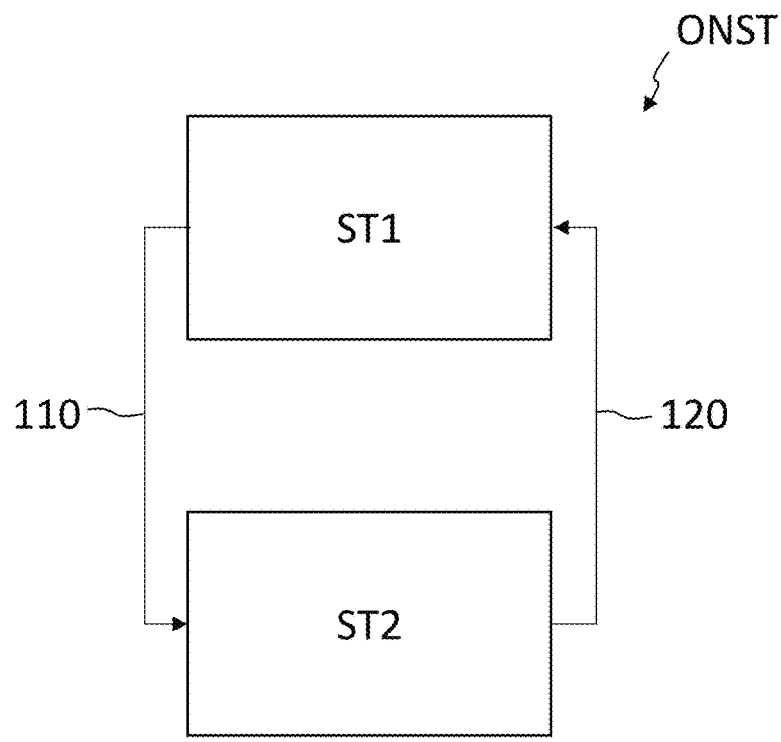
FIG. 2 shows a state diagram between a first operating state ST1 and a second operating state ST2.
Figure 3:
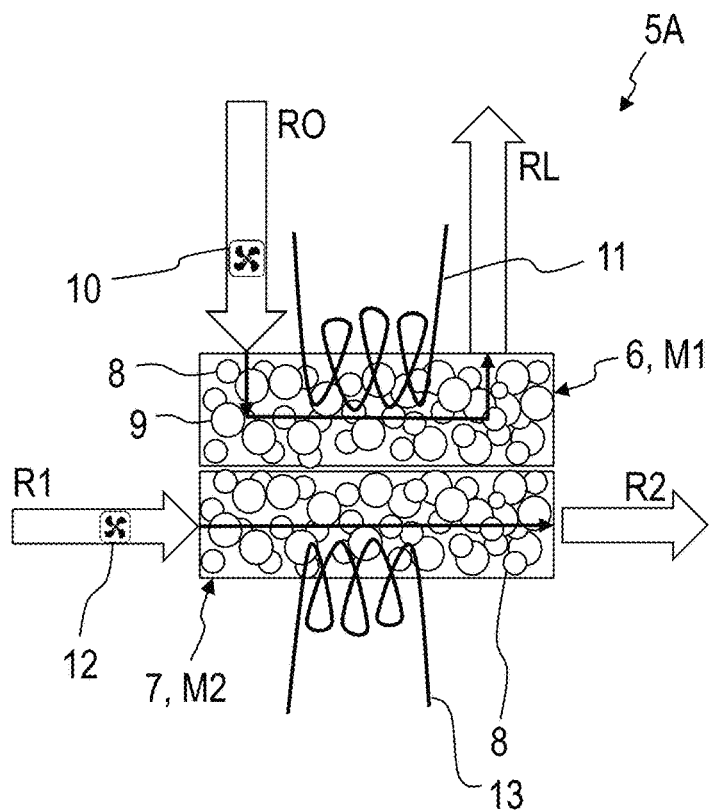
FIG. 3 shows a schematic representation of the air sorption device 5A including a first sorption unit 6 and a second sorption unit 7.

Reference is made to FIGS. 1, 2, and 3, wherein FIG. 1 shows a schematic of the device 5 for conditioning air in an enclosed space comprising an air sorption device 5A and an air distribution device 5B; FIG. 2 shows a state diagram between a first operating state ST1 and a second operating state ST2; and FIG. 3 shows a schematic representation of the air sorption device 5A including a first sorption unit 6 and a second sorption unit 7.

Various embodiments refer to a device 5 for conditioning air in enclosed space. The device 5 for conditioning air may include a first sorption unit 6, and a second sorption unit 7, e.g., jointly included in the air sorption device 5A. Each of the first sorption unit 6 and the second sorption unit 7 includes a receptacle for receiving a sorbent configured to sorb one or more air constituents, e.g., carbon dioxide and/or water. As used herein and in accordance with various embodiments, a sorbent may include one or more sorbent materials, for example first sorbent material 8 and second sorbent material 9. The sorbent e.g., as a content of a sorbent receptacle, or together with the sorbent receptacle, may be replaceable at its end of life.

Each of the first sorption unit 6 and the second sorption unit 7 is configured to (see FIG. 3) be transferred from a sorption mode M1 into a desorption mode M2 and from the desorption mode M2 into the sorption mode M1. FIG. 3 shows, for illustration purposes, the first sorption unit 6 in the sorption mode M1 and the second sorption unit 7 in the desorption mode M2. Each of the first sorption unit 6 and the second sorption unit 7 is configured to, in the sorption mode M1, sorb the one or more air constituents from air of the enclosed space; and in the desorption mode M2, desorb the one or more air constituents to a supplied regeneration air.

In sorption mode M1, the blower 10 may convey air RO to the respective sorption unit which will release clean air RL into the enclosed space. Air RO could be the loaded air from the enclosed space. Air RO may also be raw air from the external environment, which may be conditioned when required.

In the desorption mode M2, the blower 12 may convey air R1 to the respective sorption unit (which is in desorption mode) which will release loaded air R2 into the environment, thereby unloading the respective sorption unit preparing it for the next sorption cycle. Heating may be achieved by means of a heater, e.g., a respective heater 11 and 13 for each of the sorption units.

The air distribution device 5B may be configured to, in an operating state ONST, alternately operate one of the first sorption unit 6 and the second sorption unit 7 in the sorption mode M1, for example, as a function of the one or more air constituents' concentration in the air of the enclosed space, and to operate the other one of the first sorption unit 6 and the second sorption unit 7 in the desorption mode M2. The air distribution device 5B may include one or more of flaps, valves, electromechanical switches, electronic circuit, communication interface.

In accordance with various embodiments, the operating state ONST may include a first operating state ST1 and a second operating state ST2. The air distribution device 5B, and consequently the device 5 for conditioning air, may be further configured to:

(i) in the first operating state ST1, switch 110 to a second operating state ST2 in which exchange of the air of the enclosed space with exterior air is provided, if it is determined that a concentration of at least one air constituent of the one or more air constituents is above a corresponding pre-determined upper limit UPL;

(ii) in the second operating state ST2, switch 120 to the first operating state ST1, if it is determined that concentrations of all air constituents of the one or more air constituents are within their corresponding pre-determined upper limit UPL; and (iii) in the first operating state ST1, switch 130 to an idle state ST0 (see also FIG. 5), in which none of the first sorption units and the second sorption units are in the sorption mode, if it is determined that the concentrations of all air constituents of the one or more air constituents are within their corresponding pre-determined upper limit UPL minus hysteresis.

In one implementation, the idle state ST0 may be achieved from the second operating state ST2 via the first operating state ST1, In an optional implementation, in the second operation state ST2 it may be checked whether the concentrations of all air constituents of the one or more air constituents are within their corresponding pre-determined upper limit UPL minus hysteresis and then switch directly to the idle state ST0, otherwise if concentrations of all air constituents of the one or more air constituents are within their corresponding pre-determined upper limit UPL switching may occur to ST1.

Figure 4A:
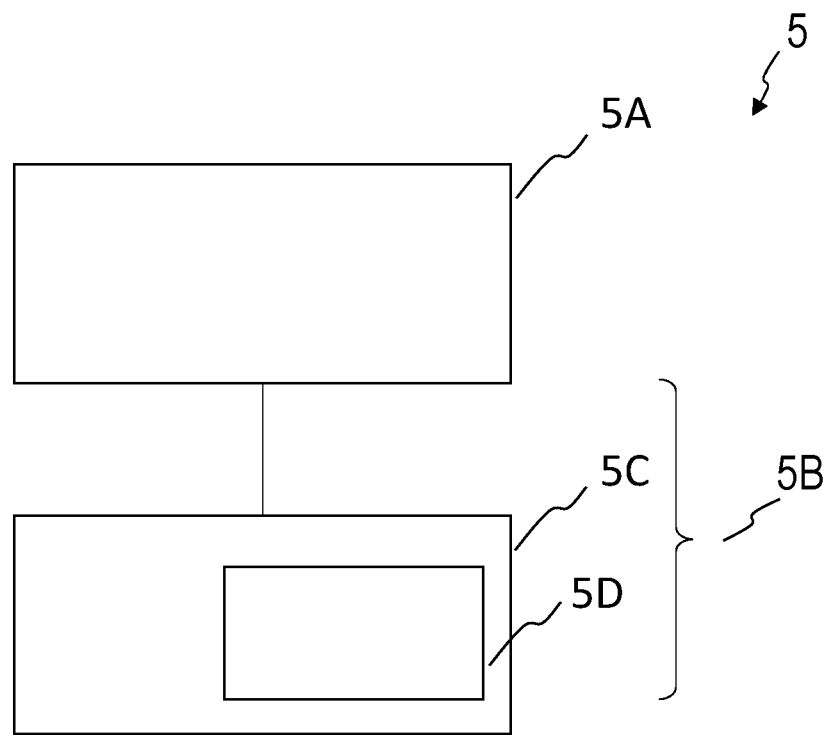
FIGS. 4A and 4B show a schematic exemplary block diagram of the components of the device 5.
Figure 4B:
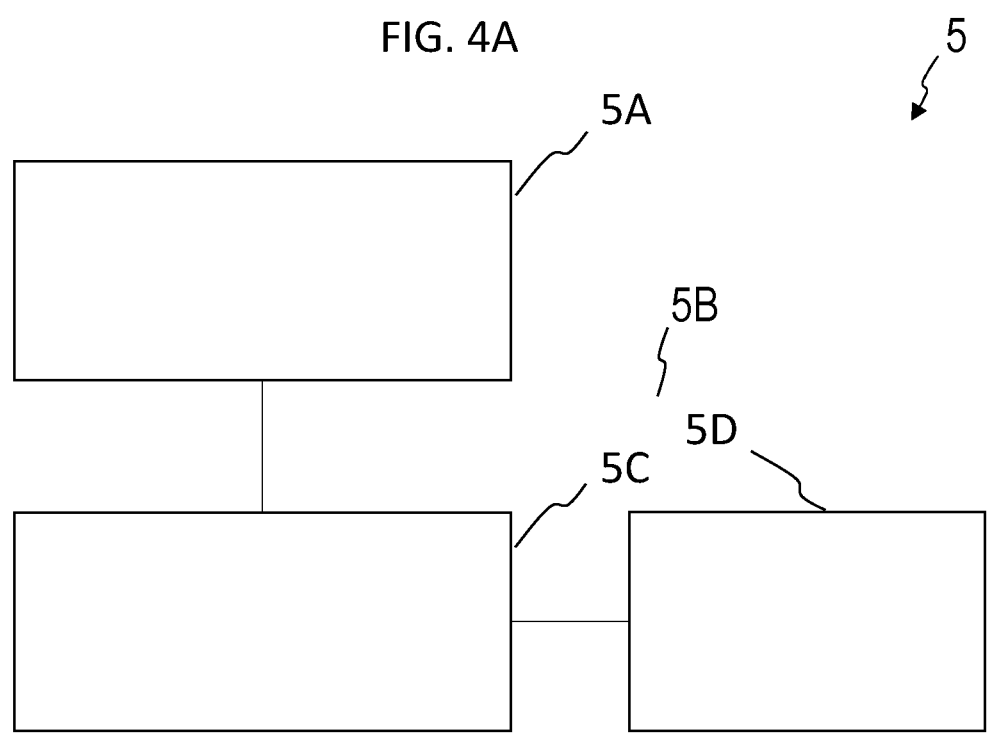

FIGS. 4A and 4B show a schematic exemplary block diagram of the components of the device 5 for conditioning air. For example, the device 5 for conditioning air may include the air sorption device 5A and the air distribution device 5B, wherein the air distribution device 5B may include mechanical components 5C such as an air flow circuit, and may further include an electronic circuit 5D. As shown in FIG. 4A, the electronic circuit 5D may be integral with the mechanical components, for example having a common substrate or in a same housing. Alternatively or in addition, as shown in FIG. 4B, the electronic circuit 5D may be external to the mechanical components. The electronic circuit 5D may include one or more of a microcontroller, a memory, a communication interface.

Figure 5:
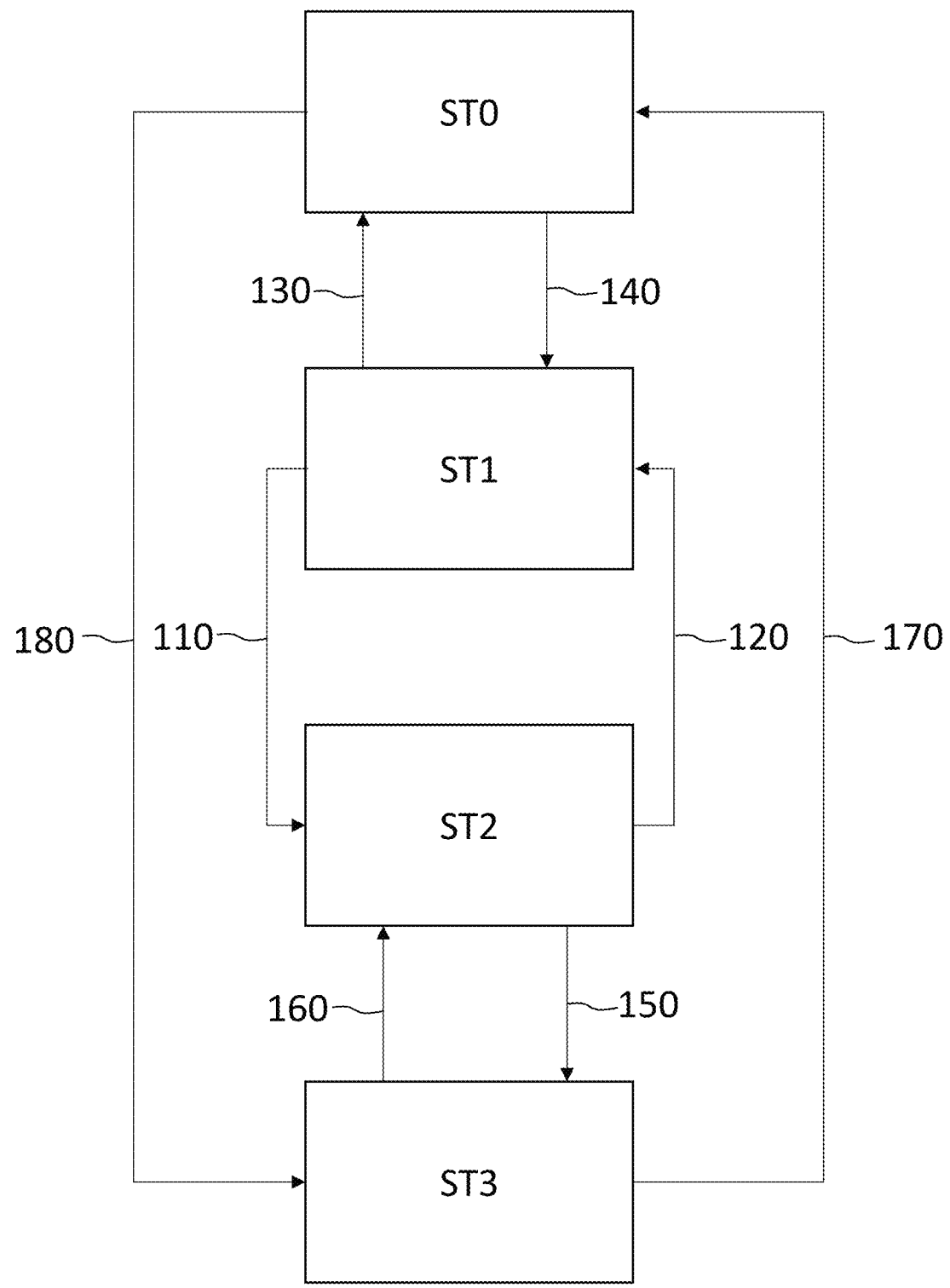
FIG. 5 shows a state diagram of the method and of the configuration of the air distribution device 5B, and device 5 used to illustrate various embodiments.

FIG. 5 shows a state diagram of the method and of the configuration of the air distribution device 5B, and consequently of device 5, used to illustrate various embodiments. The diagram of FIG. 5 is used for illustration purposes only, and not all states or switching conditions as shown need to be implemented.

According to various embodiments, the air distribution device 5B may be configured to, in the idle state ST0, switch 140 to the first operating state ST1, if it is determined that a concentration of at least one of the one or more air constituents is above its corresponding pre-determined upper limit.

According to various embodiments, the air distribution device 5B may be further configured to, in the second operating state ST2, switch 150 to a fresh air state ST3 in which none of the first sorption units and the second sorption units are in the sorption mode, if it is determined that a concentration of at least one air constituent of the one or more air constituents is outside of its corresponding pre-determined upper limit.

According to various embodiments, the air distribution device 5B may be further configured to, in the fresh air state ST3, switch 160 to the second operating state ST2, if it is determined that the concentrations of all air constituents of the one or more air constituents are within their corresponding pre-determined upper limit UPL, optionally if it is determined that the concentrations of all air constituents of the one or more air constituents are within their corresponding pre-determined upper limit UPL minus a corresponding pre-determined hysteresis.

According to various embodiments, the concentrations of the one or more air constituents may include humidity (e.g., in the form of relative humidity) as determined at a first location of the enclosed space, e.g., a wall enclosing the enclosed space, e.g., a windshield. For example at a proximity of 10 cm or less of the windshield.

According to various embodiments, the concentrations of the one or more air constituents may include humidity (e.g., in the form of relative humidity) as determined at a second location (different from the first location) of the enclosed space, e.g., flowing cabin air thus being indicative of an average value of the cabin air. Example of flowing cabin air is regeneration air entering the air distribution device.

As used herein and in accordance with various embodiment the one or more air constituents may include $CO_2$.

According to various embodiments, the air distribution device 5B may be further configured to, in the first operating state ST1, switch 110 to the second operating state ST2, if it is determined that a concentration of oxygen is lower than a pre-determined oxygen concentration lower limit LLO2, for example, irrespective of a concentration of the one or more air constituents.

According to various embodiments, the air distribution device 5B may be further configured to, in the second operating state ST2, switch 120 to the first operating state ST1, only if it is determined that the concentration of oxygen is higher than the pre-determined oxygen concentration lower limit LLO2, optionally higher than the pre-determined oxygen concentration lower limit LLO2 added to an oxygen hysteresis (OXHYST).

According to various embodiments, the air distribution device 5B may be further configured to, in the fresh air state ST3, switch 170 to the idle state ST0, if it is determined that:
(i) the concentrations of two or more, e.g., all, air constituents of the one or more air constituents are above their corresponding pre-determined operating limit OPL, and optionally below the upper limit UPL further optionally minus a corresponding pre-determined hysteresis; and
(ii) the concentration of oxygen is higher than the pre-determined oxygen concentration lower limit LLO2, optionally higher than the pre-determined oxygen concentration lower limit LLO2 added an oxygen hysteresis OXHYST.

According to various embodiments, the air distribution device 5B may be further configured to, in the idle state ST0, switch 180 to the fresh air state ST3, if it is determined that:
(i) the concentrations of two or more, e.g. all, air constituents of the one or more air constituents are above their corresponding pre-determined operating limit OPL and optionally below the upper limit; and/or
(ii) the concentration of oxygen is lower than the pre-determined oxygen concentration lower limit LLO2.

According to various embodiments, the air distribution device 5B may be further configured to, before switching to the second operating state ST2 (e.g., from the third operating state ST3) or from the second operating state ST2 to the first operating state ST1:
determine an amount of air to be exchanged for reaching the switching condition and determine an exterior air conditioning energy estimation for the amount of air;
determine an amount of the one or more air constituents to be sorbed for meeting the switching condition and determining its corresponding regeneration energy budget required to regenerate the first sorption unit 6 and/or the second sorption unit 7 for said amount of the one or more air constituents;
switch to the operating state ONST only if the regeneration energy budget is smaller than the exterior air conditioning energy estimation.

Figure 6:
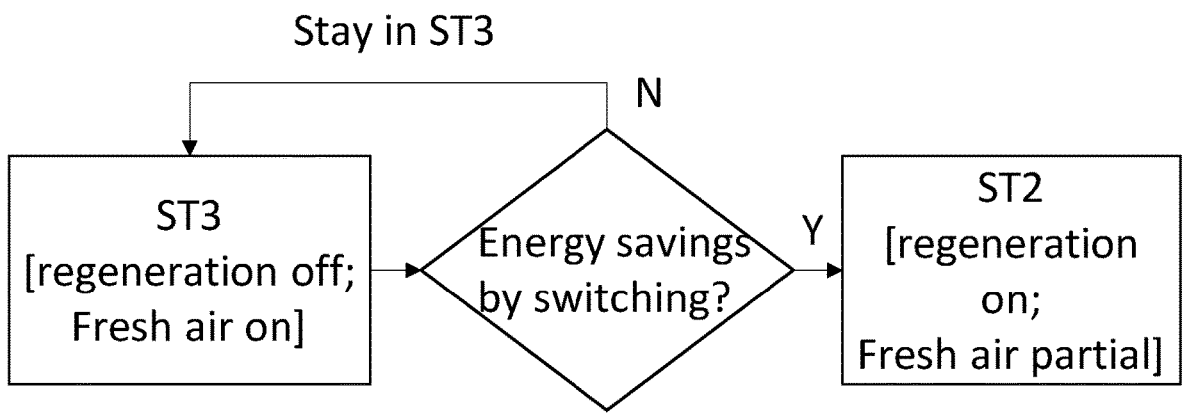
FIG. 6 shows a schematic flow chart with conditions for switching states based on the lowest estimated energy consumption.

For example, according to various embodiments and as illustrated in FIG. 6, the air distribution device 5B may be further configured to, before switching to the second operating state ST2, for example, 160 from the third operating state ST3:
determine an amount of air to be exchanged for reaching the switching condition and determine an exterior air conditioning energy estimation for the amount of air;
determine an amount of the one or more air constituents to be sorbed for meeting the switching condition and determining its corresponding regeneration energy budget required to regenerate the first sorption unit 6 and/or the second sorption unit 7 for said amount of the one or more air constituents;
switch to the second operating state ST2 only if the regeneration energy budget is smaller than the exterior air conditioning energy estimation. If the regeneration energy budget is not smaller than the exterior air conditioning energy estimation, then the air distribution device 5B remains in the third operating state ST3 which allows for inlet of exterior air. Thereby air can be replaced and the one or more air constituents can be brought within normal operation range at minimal expense of energy. Conversely, air can be regenerated if the regeneration is the route of least energy.

Figure 7:
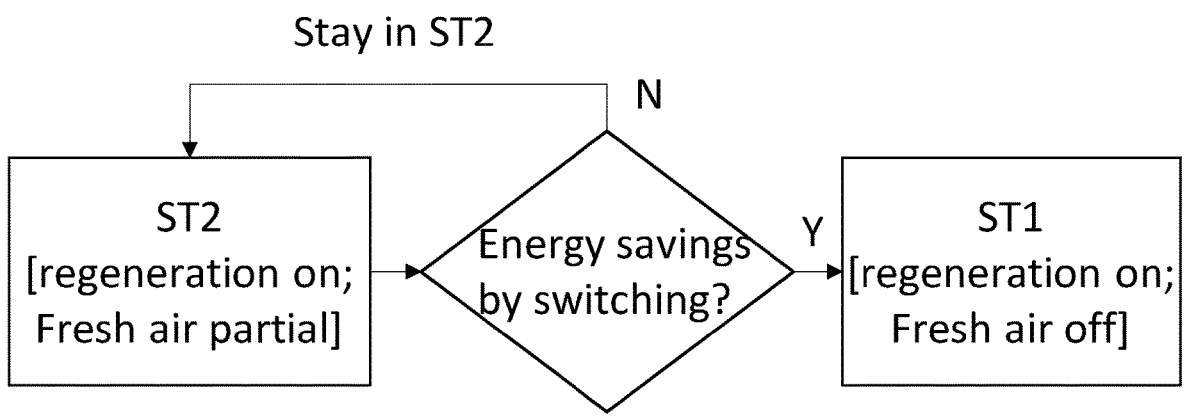
FIG. 7 shows another schematic flow chart with conditions for switching states based on the lowest estimated energy consumption.

In another example, according to various embodiments and as illustrated by FIG. 7, the air distribution device 5B may be further configured to, before switching 120 from the second operating state ST2 to the first operating state ST1:
determine an amount of air to be exchanged for reaching the switching condition and determine an exterior air conditioning energy estimation for the amount of air;
determine an amount of the one or more air constituents to be sorbed for meeting the switching condition and determining its corresponding regeneration energy budget required to regenerate the first sorption unit 6 and/or the second sorption unit 7 for said amount of the one or more air constituents;
switch to the first operating state ST1 only if the regeneration energy budget is smaller than the exterior air conditioning energy estimation. If the regeneration energy budget is not smaller than the exterior air conditioning energy estimation, then the air distribution device 5B remains in the second operating state ST2 which allows for some inlet of exterior air. Thereby air can be partially replaced and the one or more air constituents can be brought within normal operation range at minimal expense of energy by replacement and regeneration in ST2. Conversely, air can be regenerated in state ST1 if the pure regeneration is the route of least energy.

Figure 8:
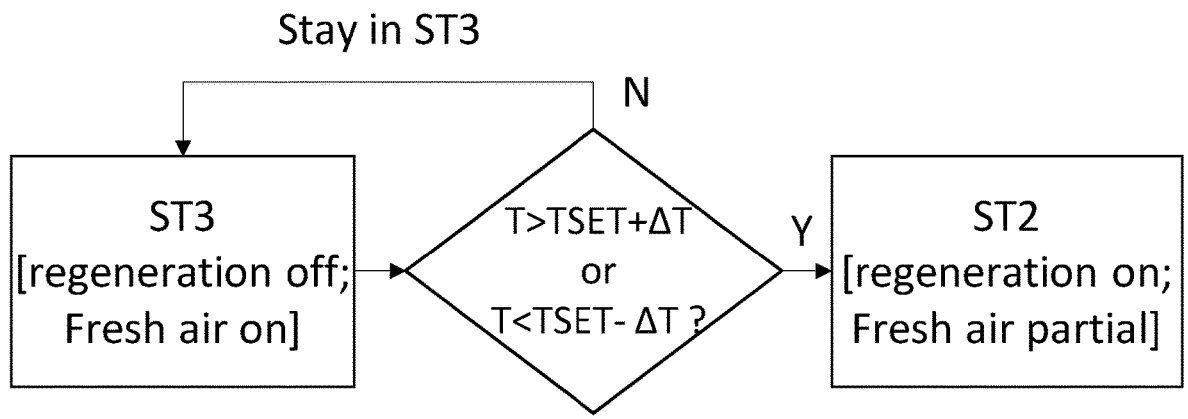
FIG. 8 shows a schematic flow chart with conditions for switching states based on the temperature difference.
Figure 9:
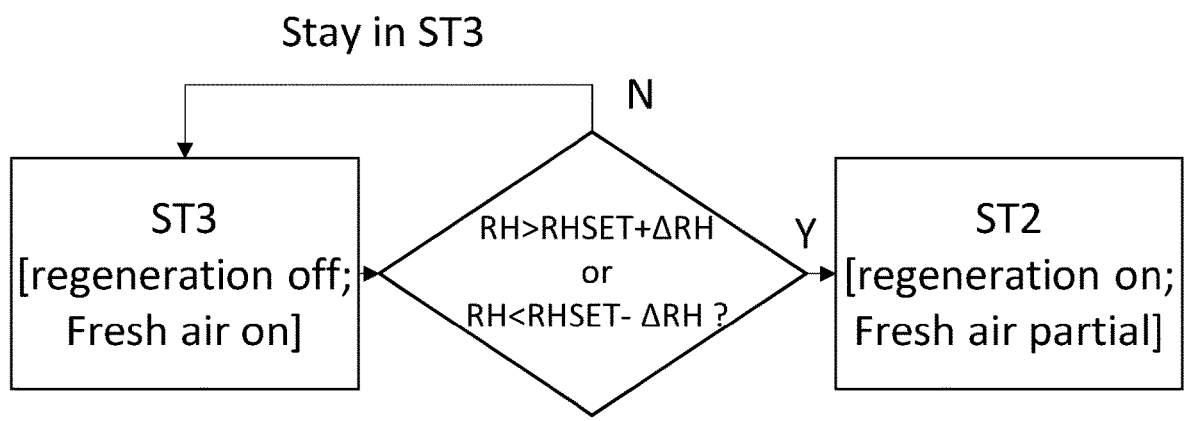
FIG. 9 shows a schematic flow chart with conditions for switching states based on the difference of relative humidity.

According to various embodiments, the air distribution device 5B may be further configured to, before switching to the second operating state ST2, for example from ST3, or from the second operating state ST2 to the first operating state ST1: switch to the operating state ONST (e.g. ST2 or ST1) only if any of temperature and relative humidity of exterior air are out of a pre-determined allowed deviation from a corresponding set value. For example, if the temperature is too high or too low, then it is likely that conditioning the exterior air would consume more energy than regenerating the cabin air. In another example, if the relative humidity is too high or too low, then it is also likely that conditioning the exterior air would consume more energy than regenerating the cabin air. Control can consider temperature only, relative humidity only, or both temperature and relative humidity. The example in FIG. 8 uses temperature (T), a pre-determined allowed deviation ($\Delta T$) and a corresponding set value (TSET), and switch from ST3 to ST2 for illustration purposes. The example in FIG. 9 uses relative humidity (RH), a pre-determined allowed deviation ($\Delta RH$) and a corresponding set value (RHSET), and switch from ST3 to ST2 for illustration purposes. Thus, a pre-determined allowed deviation from a corresponding set value can be used thereby not necessitating a calculation of the regeneration energy budget and the exterior air conditioning energy estimation.

FIGS. 10A to 10C shows in table format the switching conditions for the device 5 for conditioning air and method in accordance with various embodiments. FIG. 10A shows that in the first operating state ST1 if any concentration $C_x$ of the one or more air constituents (x) is greater than the pre-determined upper limit UPL, the action is to switch to ST2. Thus, fresh air intake helps to restore the cabin air parameters.

FIG. 10B shows that in the first operating state ST2 if any concentration $C_x$ of the one or more air constituents (x) is smaller or equal than the pre-determined upper limit UPL, the action is to switch to ST1. It s sufficient to use regenerated air and fresh air is not necessary.

FIG. 10C shows that in the first operating state ST1 if any concentration $C_x$ of the one or more air constituents (x) is smaller or equal than the pre-determined upper limit UPL minus a hysteresis Hyst, the action is to switch to ST0. Neither fresh air nor regeneration is thus needed.

Embodiments, explanations, and examples for the device may also apply for the method as disclosed herein.

The skilled person in the art will also understand that embodiments, examples, and explanations for the air distribution device apply to the device for conditioning air. For example the air distribution device being configured for a certain task also means that the device for conditioning air, which includes the air distribution device, is configured for said task.

According to one aspect and various embodiments, the disclosure concerns a method of conditioning air in an enclosed space comprising. Reference is made to the FIGS. 5 and 6 for illustration purposes. The method may include, in a first operating state ST1 and in a second operating state ST2: alternately operate one of a first sorption unit 6 and a second sorption unit 7 in a sorption mode M1 as a function of one or more air constituents' concentration in the enclosed space, and operate the other one of the first sorption unit 6 and the second sorption unit 7 in a desorption mode M2, wherein the first sorption unit 6 and the second sorption unit 7 are comprised by an device (5) for conditioning air. The method may further include operating in the first operating state ST1. The method may further include determining, in the first operating state ST1 at a first time, that a concentration of at least one air constituent of the one or more air constituents is above a corresponding pre-determined upper limit UPL. The method may further include switching 110 to a second operating state ST2 in which exchange of the air of the enclosed volume with exterior air is provided. The method may include determining, in the second operating state ST2, that concentrations of all air constituents of the one or more air constituents are within their corresponding pre-determined upper limit UPL. The method may further include switching 110 to the first operating state ST1. The method may further include in the first operating state ST1 at a second time, determined that the concentrations of all air constituents of the one or more air constituents are within their corresponding pre-determined upper limit minus hysteresis. The method may further include switching 130 to an idle state ST0, in which none of the first sorption units and the second sorption units are in the sorption mode. As used herein, and in accordance with various embodiments, the terms "first", "second", "third", "fourth", "fifth", "sixth", "seventh", "eighth", and "ninth" used in conjunction with time are used to distinguish the first time from the second time, which are different from each other, without requiring a specific sequence or order, for example, the process steps of the "second time" could occur before the process steps of the "first time".

According to various embodiments, the method may further include, in the idle state ST0 determine that a concentration of at least one of the one or more air constituents is above its corresponding pre-determined upper limit; and upon said determination, switching 140 to the first operating state ST1. The determination that a concentration of at least one of the one or more air constituents is above its corresponding pre-determined upper limit may be carried out at a third time.

According to various embodiments, the method may further include, in the second operating state ST2, determine that a concentration of at least one air constituent of the one or more air constituents is outside of its corresponding pre-determined upper limit; and upon said determination switching 150 to a fresh air state ST3 in which none of the first sorption units and the second sorption units are in the sorption mode. The determination that a concentration of at least one air constituent of the one or more air constituents is outside of its corresponding pre-determined upper limit may be carried out at a fourth time.

According to various embodiments, the method may further include, in the in the fresh air state ST3 determining that the concentrations of all air constituents of the one or more air constituents are within their corresponding pre-determined upper limit UPL, optionally determining that the concentrations of all air constituents of the one or more air constituents are within their corresponding pre-determined upper limit UPL minus a corresponding pre-defined hysteresis. The method may further include upon said determination, switching 160 to the second operating state ST2. The determination may be carried out at a fifth time.

According to various embodiments, the method may further include, in the first operating state ST1, determining that a concentration of oxygen is lower than a pre-determined oxygen concentration lower limit LLO2, for example, irrespective of any concentration of the one or more air constituents; and upon said determination, switching 110 to the second operating state ST2. The determination may be carried out at a sixth time.

According to various embodiments, the method may further include, in the second operating state ST2, determining that the concentration of oxygen is higher than the pre-determined oxygen concentration lower limit LLO2, optionally higher than the pre-determined oxygen concentration lower limit LLO2 added to an oxygen hysteresis OXHYST. The method may further include upon said determination, switching 120 to the first operating state ST1. The determination may be carried out at a seventh time.

According to various embodiments, the method may further include, in the fresh air state ST3, determining that:
(i) the concentrations of two or mor, e.g. all, air constituents of the one or more air constituents are above their corresponding pre-determined operating limit OPL, and optionally below the upper limit further optionally minus hysteresis and
(ii) the concentration of oxygen is higher than the pre-determined oxygen concentration lower limit LLO2 optionally higher than the pre-determined oxygen concentration lower limit LLO2 added an oxygen hysteresis OXHYST.

The method may further include, upon said determination, switching 170 to the idle state ST0. The determination may be carried out at an eight time.

According to various embodiments, the method may further include, the method may further include, in the idle state ST0, determining that:
(i) the concentrations of two or more, e.g. all, air constituents of the one or more air constituents are above their corresponding pre-determined operating limit OPL and optionally below the upper limit, and/or
(ii) the concentration of oxygen is lower than the pre-determined oxygen concentration lower limit LLO2; and upon said determination, switching 180 to the fresh air state ST3.

The determination may be carried out at a ninth time.

According to various embodiments, the method may include, before switching to the second operating state ST2 (e.g., from the third operating state ST3) or from the second operating state ST2 to the first operating state ST1:
determine an amount of air to be exchanged for reaching the switching condition and determine an exterior air conditioning energy estimation for the amount of air;

determine an amount of the one or more air constituents to be sorbed for meeting the switching condition and determining its corresponding regeneration energy budget required to regenerate the first sorption unit 6 and/or the second sorption unit 7 for said amount of the one or more air constituents;

switch to the operating state ONST only if the regeneration energy budget is smaller than the exterior air conditioning energy estimation.

For example, according to various embodiments and as illustrated in FIG. 6, the method may include, before switching to the second operating state ST2, for example, 160 from the third operating state ST3:

determine an amount of air to be exchanged for reaching the switching condition and determine an exterior air conditioning energy estimation for the amount of air;

determine an amount of the one or more air constituents to be sorbed for meeting the switching condition and determining its corresponding regeneration energy budget required to regenerate the first sorption unit 6 and/or the second sorption unit 7 for said amount of the one or more air constituents;

determine that the regeneration energy budget is smaller than the exterior air conditioning energy estimation, and switch to the second operating state ST2. If the regeneration energy budget is not smaller than the exterior air conditioning energy estimation, then the device 5 remains in the third operating state ST3 which allows for inlet of exterior air. Thereby air can be replaced and the one or more air constituents can be brought within normal operation range at minimal expense of energy. Conversely, air can be regenerated if the regeneration is the route of least energy.

In another example, according to various embodiments and as illustrated by FIG. 7, the method may further include, before switching 120 from the second operating state ST2 to the first operating state ST1:

determine an amount of air to be exchanged for reaching the switching condition and determine an exterior air conditioning energy estimation for the amount of air;

determine an amount of the one or more air constituents to be sorbed for meeting the switching condition and determining its corresponding regeneration energy budget required to regenerate the first sorption unit 6 and/or the second sorption unit 7 for said amount of the one or more air constituents;

determine that the regeneration energy budget is smaller than the exterior air conditioning energy estimation, and switch to the first operating state ST1 only if. If the regeneration energy budget is not smaller than the exterior air conditioning energy estimation, then the device 5 remains in the second operating state ST2 which allows for some inlet of exterior air. Thereby air can be partially replaced and the one or more air constituents can be brought within normal operation range at minimal expense of energy by replacement and regeneration in ST2. Conversely, air can be regenerated in state ST1 if the pure regeneration is the route of least energy.

According to various embodiments, the method may further include, before switching to the second operating state ST2, for example from ST3, or from the second operating state ST2 to the first operating state ST1: switch to the operating state ONST (e.g. ST2 or ST1) after determining that temperature and relative humidity of exterior air are out of a pre-determined allowed deviation from a corresponding set value. For example, if the temperature is too high or too low, then it is likely that conditioning the exterior air would consume more energy than regenerating the cabin air. In another example, if the relative humidity is too high or too low, then it is also likely that conditioning the exterior air would consume more energy than regenerating the cabin air. Control can consider temperature only, relative humidity only, or both temperature and relative humidity. The example in FIG. 8 uses temperature (T), a pre-determined allowed deviation ($\Delta T$) and a corresponding set value (TSET), and switch from ST3 to ST2 for illustration purposes. The example in FIG. 9 uses relative humidity (RH), a pre-determined allowed deviation ($\Delta RH$) and a corresponding set value (RHSET), and switch from ST3 to ST2 for illustration purposes. Thus, a pre-determined allowed deviation from a corresponding set value can be used thereby not necessitating a calculation of the regeneration energy budget and the exterior air conditioning energy estimation.

Figure 11:
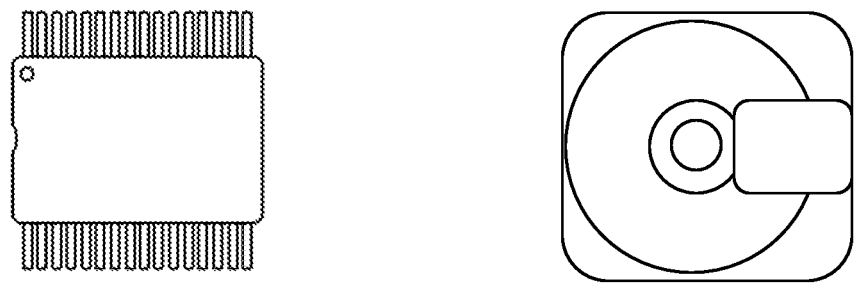
FIG. 11 shows examples of computer program products.

An aspect of the disclosure concerns a computer program product comprising instructions which, when the program is executed by a microprocessor, causes the microprocessor to perform the method in accordance with various embodiments. Non limiting examples of computer program products are shown in FIG. 11, such as a memory integrated circuit (e.g., EEPROM, flash memory), and optical and/or magnetically storage media.

Figure 12:
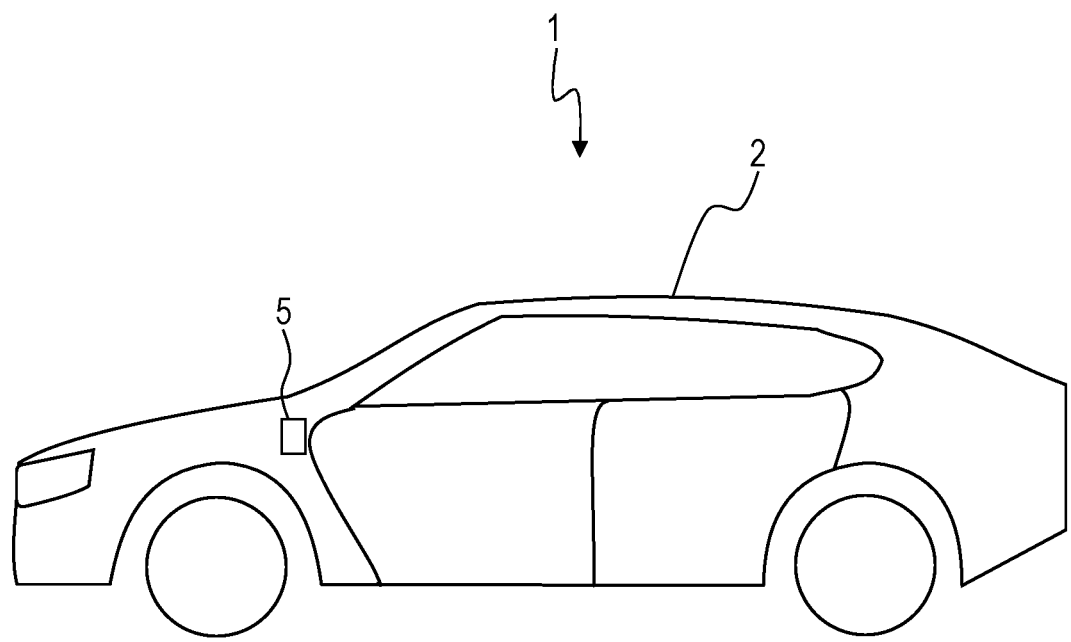
FIG. 12 a vehicle 1 comprising a cabin 2 and the device 5 for conditioning air in an enclosed space in accordance with various embodiments.

An aspect of the disclosure concerns a vehicle 1 comprising a cabin 2 and the device 5 for conditioning air in an enclosed space in accordance with various embodiments, as illustrated in FIG. 12 by way of example. The vehicle may be an electric motor vehicle or a hybrid motor vehicle. However, the vehicle can also be driven by means of an internal combustion engine or of a combustion motor. The vehicle comprises in particular a car body that encloses the enclosed air volume. In this context, "enclosed" means that the car body defines the boundaries or a geometric expansion of the air volume. This means in particular but not mandatorily that the enclosed air volume cannot be in air exchange with an environment of the vehicle. The enclosed air volume is preferably the passenger compartment of the vehicle. In particular occupants or passengers may be staying in the enclosed air volume and the vehicle may be configured for receiving occupants or passengers. The enclosed air volume is not mandatorily associated with a vehicle. The enclosed air volume can also be associated with a watercraft, a construction machine or a construction vehicle, a rail vehicle, an agricultural machine or an agricultural vehicle, or an aircraft. The enclosed air volume however can also be part of a building or of a stationary machine.

In accordance with some embodiments, the device for conditioning air can be controlled on the basis of an occupation state of the enclosed air volume with passengers in order to keep the carbon dioxide and water content in the enclosed air volume in a predetermined tolerance field, independent of the occupation state of the enclosed air volume. In this way, it is always ensured that the carbon dioxide and water contents does not rise undesirably. By adjustment to the occupation state, energy can be saved because, for example, for an occupation state with one passenger, a reduced conveying performance of the first blower can be selected in comparison to an occupation state with four passengers. The occupation state can be detected, for example, by means of weight sensors or optical sensors.

Aspects and embodiments of the present disclosure provide may reduce or avoid windshield fogging, in particular, in the winter, and reduce or avoid condensation in summer.

Further increased comfort may be provided, in particular skin comfort due to the regulation of water content in the air.

The invention claimed is:

1. A device for conditioning air in an enclosed space, the device comprising:
a first sorption unit, and a second sorption unit,
wherein each of the first sorption unit and the second sorption unit comprises a receptacle for receiving a sorbent configured to sorb one or more air constituents, and
wherein each of the first sorption unit and the second sorption unit is configured to:
be transferred from a sorption mode into a desorption mode;
be transferred from the desorption mode into the sorption mode;
in the sorption mode, sorb at least one of the one or more air constituents from the air of the enclosed space; and
in the desorption mode, desorb at least one air constituent of the one or more air constituents; and
an air distribution device configured to, in an operating state, alternately operate one of the first sorption unit and the second sorption unit in the sorption mode; and to operate the other one of the first sorption unit and the second sorption unit in the desorption mode,
wherein the operating state comprises a first operating state and a second operating state, and
wherein the air distribution device is further configured to:
in the first operating state, switch to the second operating state in which exchange of the air of the enclosed space with exterior air is provided, if it is determined that a concentration of at least one air constituent of the one or more air constituents is above a corresponding pre-determined upper limit;
in the second operating state, switch to the first operating state, if it is determined that the concentrations of air constituents of the one or more air constituents are below or up to their corresponding pre-determined upper limit;
in the first operating state, switch to an idle state, in which none of the first sorption unit and the second sorption unit is in the sorption mode, if it is determined that the concentrations of all air constituents of the one or more air constituents are within their corresponding pre-determined upper limit.

2. The device for conditioning air of claim 1, wherein the air distribution device is further configured to, in the idle state, switch to the first operating state, if it is determined that a concentration of at least one air constituent of the one or more air constituents is above its corresponding pre-determined upper limit.

3. The device for conditioning air of claim 1, wherein the air distribution device is further configured to, in the second operating state, switch to a fresh air state in which none of the first sorption units and the second sorption units are in the sorption mode, if it is determined that a concentration of at least one air constituent of the one or more air constituents is above of its corresponding pre-determined upper limit.

4. The device for conditioning air of claim 3, wherein the air distribution device is further configured to, in the fresh air state, switch to the second operating state, if it is determined that the concentrations of all air constituents of the one or more air constituents are below or up to their corresponding pre-determined upper limit.

5. The device for conditioning air of claim 1, wherein the concentrations of the one or more air constituents comprises humidity as determined at a first location of the enclosed space.

6. The device for conditioning air of claim 5, wherein the concentrations of the one or more air constituents comprises humidity as determined at a second location of the enclosed space.

7. The device for conditioning air of claim 3, wherein the air distribution device is further configured to:
in the first operating state, switch to the second operating state, if it is determined that a concentration of oxygen is lower than a pre-determined oxygen concentration lower limit.

8. The device for conditioning air of claim 7, wherein the air distribution device is further configured to:
in the second operating state, switch to the first operating state, only if it is determined that the concentration of oxygen is higher than the pre-determined oxygen concentration lower limit.

9. The device for conditioning air of claim 7, wherein the air distribution device is further configured to, in the fresh air state, switch to the idle state, if it is determined that the concentrations of all air constituents of the one or more air constituents are above their corresponding pre-determined operating limit and the concentration of oxygen is higher than the pre-determined oxygen concentration lower limit.

10. The device for conditioning air of claim 7, wherein the air distribution device is further configured to, in the idle state, switch to the fresh air state, if it is determined that the concentrations of all air constituents of the one or more air constituents are above their corresponding pre-determined operating limit and the concentration of oxygen is lower than the pre-determined oxygen concentration lower limit.

11. The device for conditioning air of claim 1,
wherein a switching condition is met for switching from the first operating state to the second operating state if it is determined that the concentration of the at least one air constituent of the one or more air constituents is above its corresponding pre-determined upper limit, and
wherein the switching condition is met for switching form the second operating state to the first operating state if it is determined that the concentrations of the at least one of the one or more air constituents are below or up to their corresponding pre-determined upper limits,
the air distribution device is further configured to, before switching from the first operating state to the second operating state or from the second operating state to the first operating state:
determine an amount of air to be exchanged for reaching the switching condition and determine an exterior air conditioning energy estimation for the amount of air;
determine an amount of the one or more air constituents to be sorbed for meeting the switching condition and determine its corresponding regeneration energy budget required to regenerate the first sorption unit and/or the second sorption unit for the amount of the one or more air constituents; and
switch to the second operating state or switch to the first operating state only if the regeneration energy budget is smaller than the exterior air conditioning energy estimation.

12. The device for conditioning air of claim 1, wherein the air distribution device is further configured to, before switching from the first operating state to the second operating state:

switch to the second operating state only if a temperature and a relative humidity of exterior air are each within a pre-determined range of a corresponding set value.

13. A vehicle comprising the device for conditioning air in an enclosed space of claim 1.

14. A method of conditioning air in an enclosed space comprising:
   in a first operating state and in a second operating state, alternately operating one of a first sorption unit and a second sorption unit in a sorption mode as a function of a concentration of one or more air constituents in the enclosed space, and operating the other one of the first sorption unit and the second sorption unit in a desorption mode, wherein the first sorption unit and the second sorption unit are comprised by a device for conditioning air;
   operating the device for conditioning air in the first operating state;
   determining, in the first operating state at a first time, that a concentration of at least one air constituent of the one or more air constituents is above a corresponding pre-determined upper limit;
   switching to the second operating state in which exchange of the air of the enclosed volume with exterior air is provided;
   determining, in the second operating state, that concentrations of all air constituents of the one or more air constituents are below or up to their corresponding pre-determined upper limit; and
   switching to the first operating state;
   in the first operating state at a second time, determining that the concentrations of all air constituents of the one or more air constituents are or up to their corresponding pre-determined upper limit; and
   switching to an idle state, in which none of the first sorption units and the second sorption units are in the sorption mode.

15. The method of conditioning air of claim 14, further comprising, in the idle state:
   determining that a concentration of at least one of the one or more air constituents is above its corresponding pre-determined upper limit, and
   after said determination, switching to the first operating state.

16. The method of conditioning air of claim 14, further comprising, in the second operating state:
   determining that a concentration of at least one air constituent of the one or more air constituents is above its corresponding pre-determined upper limit, and
   after said determination, switching to a fresh air state in which none of the first sorption units and the second sorption units are in the sorption mode.

17. The method of conditioning air of claim 16, further comprising, in the fresh air state:
   determining that the concentrations of all air constituents of the one or more air constituents are below or up to their corresponding pre-determined upper limit, and
   after said determination, switching to the second operating state.

18. The method of conditioning air of claim 14, wherein the concentrations of the one or more air constituents comprises humidity as determined at a first location of the enclosed space.

19. The method of conditioning air of claim 18, wherein the concentrations of the one or more air constituents comprises humidity as determined at a second location of the enclosed space.

20. The method of conditioning air of claim 14, further comprising, in the first operating state:
   determining that a concentration of oxygen is lower than a pre-determined oxygen concentration lower limit, and
   after said determination, switching to the second operating state.

* * * * *